United States Patent [19]
Milligan et al.

[11] Patent Number: 5,758,151
[45] Date of Patent: *May 26, 1998

[54] SERIAL DATA STORAGE FOR MULTIPLE ACCESS DEMAND

[75] Inventors: Charles A. Milligan, Golden; Darcy M. Palmer, Longmont, both of Colo.

[73] Assignee: Storage Technology Corporation, Louisville, Colo.

[*] Notice: The term of this patent shall not extend beyond the expiration date of Pat. No. 5,369,641.

[21] Appl. No.: 352,648

[22] Filed: Dec. 9, 1994

[51] Int. Cl.$^6$ .................................................. G06F 17/30
[52] U.S. Cl. .................... 395/611; 395/610; 395/613; 395/615; 395/200.61
[58] Field of Search .................... 395/60, 61, 62, 395/200

[56] References Cited

U.S. PATENT DOCUMENTS

| 4,831,582 | 5/1989 | Miller et al. | 395/615 |
|---|---|---|---|
| 5,369,532 | 11/1994 | Dodt et al. | 360/48 |
| 5,369,641 | 11/1994 | Dodt et al. | 371/2.2 |
| 5,485,321 | 1/1996 | Leonhardt et al. | 360/48 |
| 5,586,264 | 12/1996 | Belknap et al. | 395/200.49 |
| 5,671,436 | 9/1997 | Morris et al. | 395/610 |

OTHER PUBLICATIONS

Hodge & Milligan, "True Video on Demand vs. Near Video on Demand, Statistical Modeling, Cost & Performance Trade-Offs", May 23, 1994.

*Primary Examiner*—Wayne Amsbury
*Attorney, Agent, or Firm*—Brooks & Kushman, P.C.

[57] ABSTRACT

A data storage and retrieval method is disclosed for storing a unitary serial data in such a fashion that it can be read out multiple times in real time. The solution to the concurrent demand for serial data lies in the mapping of the data on a storage device using a method that presumes, but does not require, multiple concurrent access. The data set is resequenced from its logical data structure and stored on a medium adapted for use by the data storage and retrieval drive such that the new sequence appropriately supports concurrent use demand. In accordance with the invention, a serial data set, such as a movie, is segmented into substantially equal data subsets which is hardware capability determinative in that data storage and retrieval device data transfer rates are significantly greater than end user data transmission-reception rates. The data set is thus segmented in accordance with the number of threads to be supported for the concurrent demand. Each segment are subpartitioned into smaller piece subsets of the segment subsets. By packetizing the resequenced data set, standard techniques for cache.

28 Claims, 9 Drawing Sheets

SERIAL DATA STORAGE FOR MULTIPLE ACCESS DEMAND

RELATED APPLICATIONS

This application is related to the following, incorporated herein by reference:

U.S. patent application Ser. No. 07/791,489, by Burns et al., filed on Nov. 12, 1991, for a Method and Apparatus for Administering Data on Magnetic Tape Media (now abandoned);

U.S. patent application Ser. No. 07/896,106, by Dodt et al., filed on Jun. 9, 1992, now U.S. Pat. No. 5,369,532, Continuation-in-Part to Ser. No. 07/791,489, supra, for a Method and Apparatus for Managing Data on Rewriteable Media to Define Read/Write Operational Status;

U.S. patent application Ser. No. 07/791,793, by Dodt et al., filed on Nov. 12, 1991, for a Method and apparatus for Detecting and Correcting Error in Data on Magnetic Tape Media, now U.S. Pat. No. 5,369,641;

U.S. patent application Ser. No. 08/242,719, by Dodt et al., filed on May 13, 1994, Continuation-in-Part to Ser. No. 07/791,793, supra, for a Method and Apparatus for Administering Video Data on Magnetic Tape Media, now U.S. Pat. No. 5,526,198;

U.S. patent application Ser. No. 08/266,026, Dodt et al., filed on Jun. 27, 1994, Continuation-in-Part to Ser. No. 07/791,793, supra, for a Method and Apparatus for Administering Video Data on Magnetic Tape Media, now U.S. Pat. No. 5,576,903; and U.S. patent application Ser. No. 08/176,162, by Leonhardt and Milligan, filed on Dec. 29, 1993 for a Format and Method for Recording Optimization, now U.S. Pat. No. 5,485,321;

each of which is assigned to the common assignee of the present invention.

FIELD OF THE INVENTION

The present invention relates generally to data storage, more particularly to data on demand type systems and, more specifically to a data storage and retrieval method for serial data for which there will be concurrent access demand.

BACKGROUND OF THE INVENTION

With the emergence of digital communications as a major industry in the form of computer networks, such as local-area networks (LAN) and wide-area networks (WAN), cable and interactive television, information highways, and the like, there is a growing need for systems adapted to provide concurrent use of serial data.

For example, in the cable television industry there is a requirement for concurrent transmission to many end-users, known as True Video-On-Demand ("TVOD") or Near-Video-On-Demand ("NVOD") technology. In reality, access to recorded material with a zero access time is not physically possible. In other words, TVOD does not exist. Fractional second access VOD is possible, but is very expensive for an extensive menu of choices (e.g., 500 channels) for a large number of subscribers. Thus, cost of service versus the end user, or "customer," wait time is of serious importance. Moreover, hardware such as disk or tape drives have latency periods (inherent storage media and drive non-transfer motion or function implementation delays). Therefore, NVOD with a reasonable response time from customer program selection to program delivery (namely, ranging from mere seconds to a few minutes) is a practical solution.

Currently, multiple copies of serial data sets are stored. For example, a particular movie is stored in duplicate copies, one for each of the number of potential users of the data, such as for each station showing the movie concurrently. This solution is neither cost nor equipment efficient.

As another example, public libraries are becoming more and more computer oriented. There may often be several patrons attempting to access the same reference document with the shortest possible customer waiting period. While technically possible, the maintaining and concurrent transmitting of duplicate copies may be cost prohibitive and attempted concurrent use may require unacceptable customer waiting time.

Thus, such multiple serial data demands raise the problem of providing the data without concomitant multiple copies of each data set, namely one for each concurrent request. A further complication of the problem is that the data stream must often be available for uninterrupted transmission, such as in the case of a movie. The minimization of both customer waiting time and latency periods must be addressed by the solution.

SUMMARY OF THE INVENTION

In its basic aspects, the present invention provides a method for storing serial data to enable substantially concurrent access to a unitary serial data set stored on an accessible storage medium adapted for use with a data storage and retrieval system. The method includes: dividing a serial data set into a plurality of sequential segments; subdividing each of the segments into a plurality of sequential pieces; and recording the serial data set onto a storage medium such that the serial data set is resequenced according to sequential piece order for all segments by sequential segment order.

It is an advantage of the present invention that it allows multiple users to access a stored, unitary, serial data set.

It is another advantage of the present invention that it provides a methodology for providing concurrent output of a very large data base using a low cost mass storage device and a relatively small, inexpensive buffer device.

It is yet another advantage of the present invention that customer waiting time is minimized.

It is still another advantage of the present invention that latencies are minimized.

It is still another advantage of the present invention that it provides a method for storage of serial data which permits the substantially concurrent access by multiple end users without the requirement of having multiple copies available for access.

It is an advantage of the present invention that it is amenable to the use of a variety of mass storage devices such as magnetic tape or direct access storage device (DASD) systems (hard disk arrays, optical disk, magneto-optical disk).

It is a further advantage of the present invention that it allows the storage of multiple serial data sets on a single storage medium.

It is yet another advantage of the present invention that it can be used as a method to store data substantially concurrently on a storage medium from a plurality of sources, for example, by network terminals performing backup routines.

It is yet a further advantage of the present invention that it affords an alternative method of a high speed search of multiple serial data sets on a single storage medium.

Other objects, features and advantages of the present invention will become apparent upon consideration of the following detailed description and the accompanying drawings, in which like reference designations represent like features throughout the FIGURES.

DESCRIPTION OF THE DRAWINGS

FIG. 6, incorporating

FIG. 7, including

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable.

General Concepts

Figure 1:
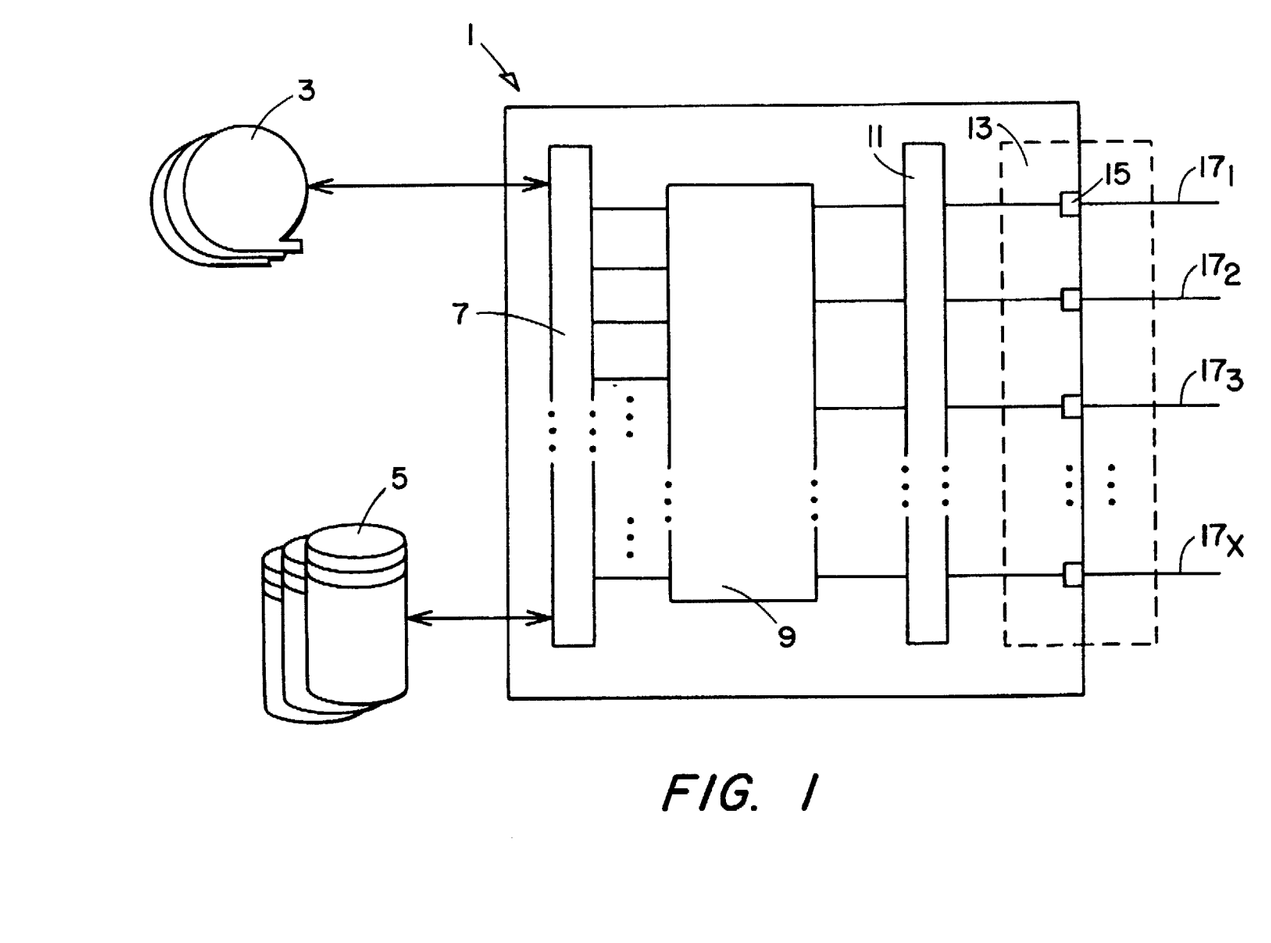
FIG. 1 is a schematic block diagram of a system adapted for use in accordance with the present invention.

As shown in FIG. 1, a system 1 for providing a serial data library, or multiple libraries, would typically have many accessible media in one or more forms, such as a tape library 3 and a disk library 5. A first bus 7 connects the data base libraries 3, 5 to a cache memory device 9. The cache 9, used for storing data during transmission delays, in turn connects to a data translation system 11 which connects to a system input-output device 13, including speed matching buffers 15. The input-output device 13 would provide end user access via input-output lines $17_1$ through $17_x$. There are many possible variations in the cache layout, data transmission hardware, and protocols. The above-referenced patent applications by Dodt et al. provide a more detailed discussion of such implementations.

The goal is to allow, but not mandate, substantially concurrent access to a unitary serial data set on one medium in one of the data base libraries 3, 5. Basically, each end-user supported is via an input-output line 17 when requesting a sequential pass through a serial data set.

A single movie can occupy many gigabytes of serial data. Textual materials may comprise tens of gigabytes or even terabytes of data. To store such large data bases in a solid state memory is prohibitively expensive. Therefore, the solution must satisfy the need for allowing inexpensive mass storage. The libraries 3, 5 use storage media which is relatively inexpensive and store multiple gigabytes of data on each unit of storage, e.g., tape cartridges, with a reasonable buffering mechanism, such as a cache 9. Solutions which effectively limit the required capacity of the cache 9 are desirable in reducing the cost of the system.

An important consideration in the multi-user concurrent access concept is the inherent operational characteristics of the mass storage devices used for each library. Interruptions in normal operations come from such data processing functions such as SEEK commands, error correction functions ("ECC"), physical limitations inherent in the tape transport and read-write head to medium interface, and the like as would be known to a person skilled in the art, referred to hereinafter as device specific latencies. In general, it should be kept in mind that data mass storage device transfer rates are greater than the end user transmission rates.

The effective device transfer rate is the sustained data transfer rate of the device, down-graded by non-transfer movements such as seeking tracks, head selecting, searching forward and rewinding. The drawings represent such latencies as shaded areas. The summation of all the non-transfer motions required by the device will be used to adjust the data transfer rate down such that it is known how much data to be read per unit time. Buffering (caching) will be required during the down time when the application requires continuous data transmission. The longest of the non-transfer positioning times (either expected or for error correction) will determine the size of the needed buffer.

Since both disk drives and tape drives can read and write data with transfer rates substantially greater than required for a single channel transmission rate, it would be advantageous to store the data in such a fashion that in the time required to read in multiple data sets it can transmit each of the data sets substantially simultaneously. The solution in accordance with the present invention to the concurrent demand for serial data lies in the mapping of the data on a storage device using a method that presumes, but does not require, multiple access. Note that allowing multiple users access to the same transmission is allowed for non-interactive applications. These groups of users are referred to herein as a set.

In order to provide a better understanding of the present invention, an exemplary embodiment of a demand for transmission of a movie in the library 3, 5 to a number, less than or equal to "x," of sets for concurrent display will be employed. A limitation on the scope of the present invention or its use is not intended by the inventors by the use of this exemplary embodiment nor should any be implied.

A thread is defined as continuous serial data representing one complete data base, e.g. a movie. In other words, one entire use of the data base would comprise one sequential pass from the first byte to the last, or one thread. The present invention allows multiple use of a thread, namely by multiple end users, starting at the same time which is a substantially simultaneous use of a thread. It is also possible in accordance with the present invention to make use of more than one thread, active concurrently with an offset that is minimized (that is, the offset is an acceptable customer waiting time), thus designated as a concurrent use of the serial data base by a multiplicity of threads which may have a multiplicity of users.

Data Storage

Figure 2:
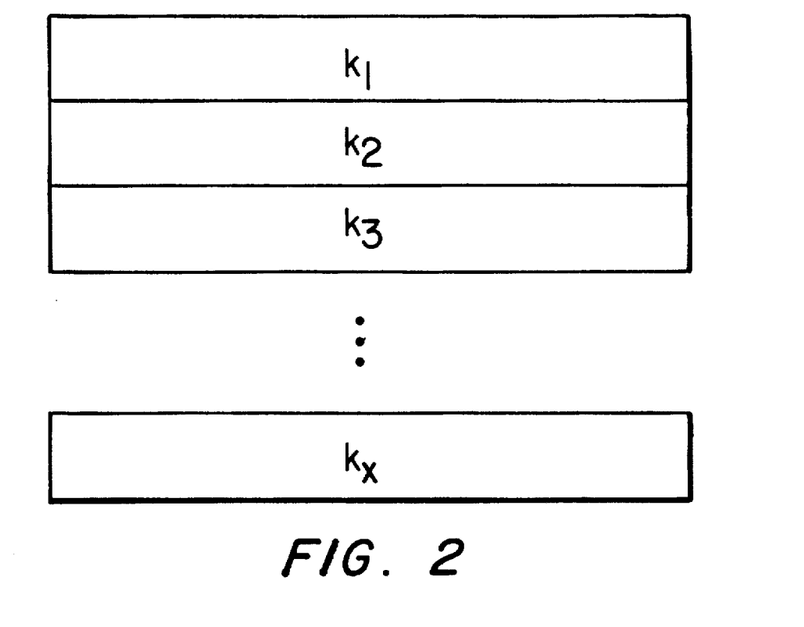
FIG. 2 is a schematic depiction of a unitary serial data set that is divided in accordance with the present invention into segments, "$k_1$" through "$k_x$," representative of a maximum number of different sets of users to be allowed substantially concurrent access to the serial data set.

The first step of the methodology of the present invention is to divide the data base, i.e., the movie, into a number of segments, "i," as depicted in FIG. 2. The preferred embodiment herein describes data divided into substantially equal length segments; the intent is to discuss these segments in terms of time rather than data capacities. Although more complex to manage, the segments can be of significantly different sizes both in terms of time to traverse and in terms of data content. The maximum wait time for a user for the data is the length of one segment (or the largest segment in the more complex approach). Since the movie is of a fixed length and minimization of the wait time is the goal, the number of segments should be maximized. The possible number of segments into which a thread can be divided, "$x_{max}$," is determined by the ratio of the effective device transfer rate ("TR") of the mass storage device 3, 5 (e.g., a tape drive, where the effective device rate is the sustained data transfer rate adjusted for latencies as described above) to the end user data transmission-reception rate ("EUTR") on transmission lines $17_1 \ldots 17_x$:

$$x_{max} = \frac{\text{effective device transfer rate (quantity/second)}}{\text{end user rate (quantity/second)}} = \frac{TR}{EUTR}$$

where "quantity" in the current state of the art is generally given in megabytes, "MB," and discarding any fractional remainder when the drive device effective transfer rate, TR, is at least twice the end user rate, EUTR. For example, a streaming tape drive may have a "TR" of 6 Mb/s but the video display may operate at an "EUTR" of 0.5 Mb/s, making twelve the maximum number of segments and the maximum number of threads capable of obtaining substantially concurrent access to the data base. The segments are all the same length; the last segment may be padded where necessary.

As another example of calculating "$x_{max}$," the industry currently is in support of employing 50 Mhz to 500 Mhz transmission rates for conventional analog TV and 500 Mhz to 1000 Mhz for digital interactive TV, while the 5 Mhz to 50 Mhz band is reserved for reverse channel communications. If a mass storage device is able to sustain (that is, the instantaneous data rate discounted by the non-transfer times during latencies) a data rate ten times greater than is required for normal video rates, ten threads can be supported.

Buffering must be adequate to mask the duration of the worst case device read interruption latencies that might occur (e.g., turnaround at the end of a tape track, head disk CYLINDER SEEK command implementation, or the like). Note that for applications that do not require uninterrupted access, a smaller buffer can be used or buffering can be entirely bypassed. Also in such applications, the number of threads greater than "$x_{max}$" can be supported, but the user will experience waiting whenever the number of segments is greater than the calculated "$x_{max}$."

For applications that require continuous data, the number of segments used may be less than the calculated maximum. Let "x" represent the number of segments to be use. The maximum time a customer will have to wait to begin using the data is also known:

$1/x$ * (time to use the data base).

For end users wanting the shortest wait, the larger the value of "x" the better as long as "x"$\leq$"$x_{max}$." Since getting "x" to be as large as possible may require more expensive hardware implementations, the design of any particular system will deal with the trade-off between cost and customer waiting time.

Figure 3:
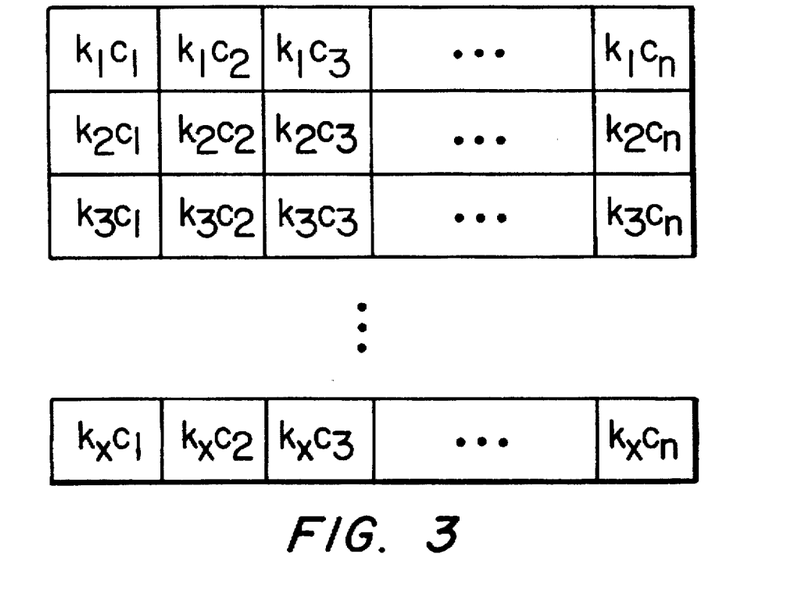
FIG. 3 is a schematic depiction of the data base wherein the segments "$k_1$" through "$k_x$" as shown in FIG. 2 are subdivided into pieces "$c_1$" through "$c_n$."

As depicted in FIG. 3, the data base segments "$k_1$" through "$k_x$," where "x" is less than or equal to "$x_{max}$," are next subdivided into pieces "c," where the size of the largest piece, "$c_i$," is greater than or equal to the size of each of $c_1$, $c_2, \ldots c_{i-1}, C_{i+1}, \ldots$ for "i"=1 to "n," and the minimum number of pieces "n" is:

$$n \geq \frac{\text{data base size (bytes)}}{\text{cache buffer size (bytes allocated for transfer of this data base)}}$$

and the largest piece, "$c_{max}$" ($c_i$ as defined above) is:

$$c_{max} = \frac{\text{cache buffer size allocated for transfer of this data base}}{x \text{ (the number of segments)}}$$

Note that the maximum size of a piece (i.e., $c_{max}$) is generally the minimum of either the calculation, $c_{max}$ as calculated above, or the maximum amount of a data base that can be accessed before a physical limitation on the recording medium is encountered, for example, a latency caused by the need to move the head to a new cylinder. It is not required, but the preferred embodiment is that there be no non-transfer times in the middle of a packet transfer.

Piece size can also be predetermined to be less than the calculation of $c_{max}$ would allow, e.g. $c_{max}/2$. The design may be chosen to fit a particular hardware implementation, i.e., a piece may be x-bits, a byte, a sector, a track, or the like. All pieces, $c_j$, must be the same size for all "x" segments $k_1$ to $k_x$, but $c_j$ pieces can be a different size than $c_n$ pieces when "n" is not equal to "j."

Figure 4:
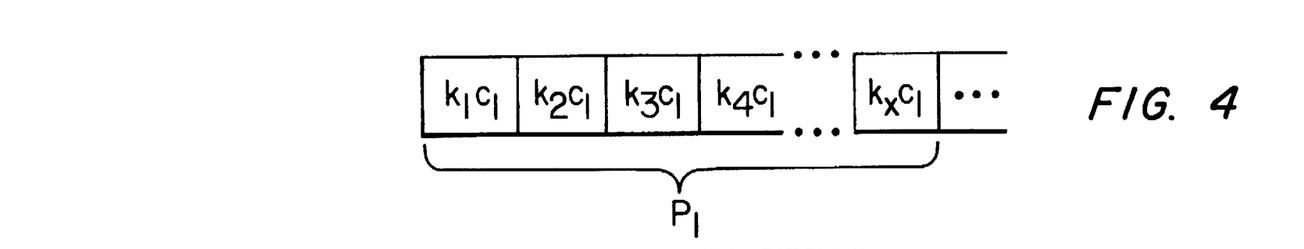
FIG. 4 is a schematic depiction of the data base as shown in FIG. 3 that has been restructured into an exemplary predefined packet, "$p_1$."
Figure 5:
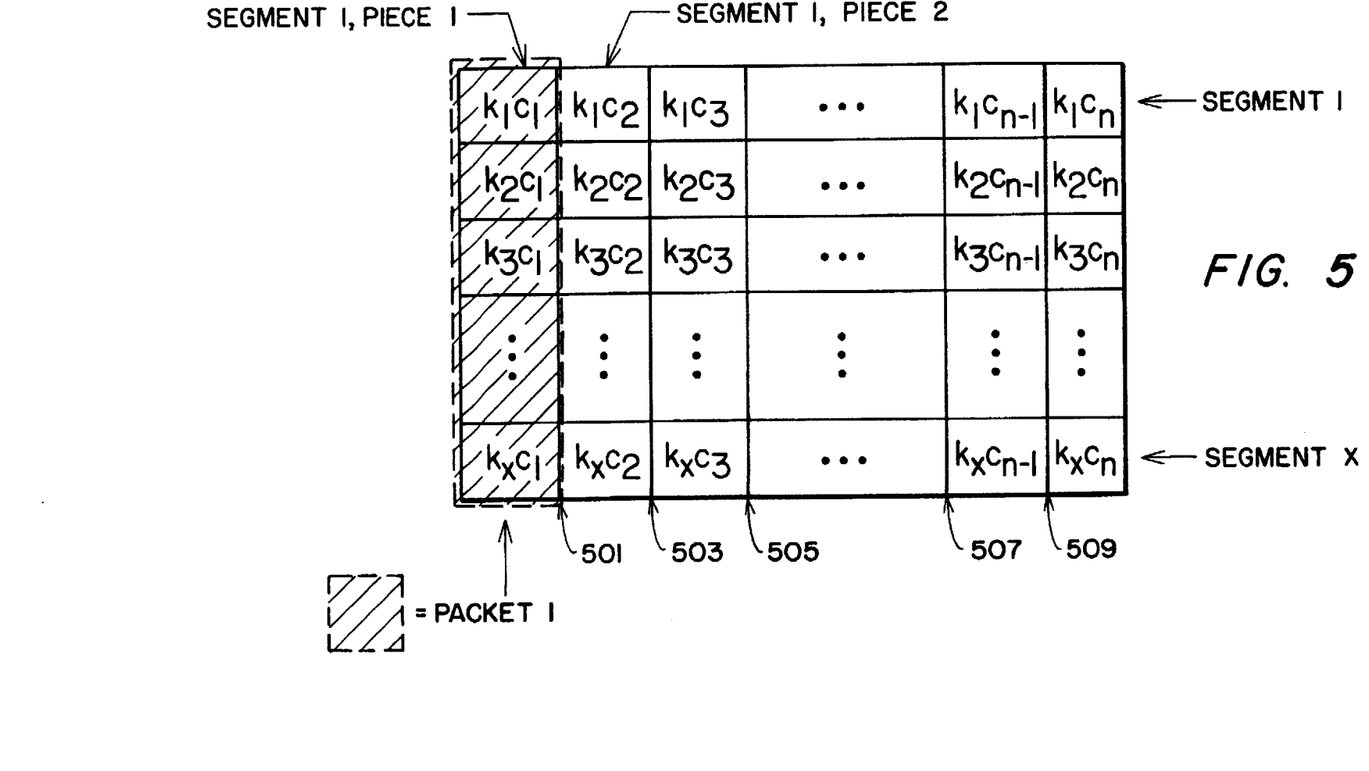
FIG. 5 is a schematic depiction of a data storage map for recording medium employing "$k_x$" segments and "$c_n$" pieces wherein each vertical column is a packet "$p_1$" through "$p_n$" according to the data base restructuring as shown in FIG. 4.

Each data base having been divided into segments (FIG. 2) and each segment having been subdivided into substantially equal pieces (FIG. 3), the pieces are now reordered to form packets such that each packet contains a piece from each segment in the same position in each segment as shown in FIGS. 4 and 5. In other words, the packet "$p_j$" consists of all the $c_j$ pieces from all the segments as shown in FIG. 4. It will be recognized from FIG. 5 that each column as shown in FIG. 3 has now been designated a packet of data. Thus, a packet can be described as:

$$\text{packet}_j = p_j = \sum_{i=1}^{i=x} \text{pieces } c_j \text{ from segment } k_i$$

since the size of each piece$_n$ of all $k_1$ to $k_x$ segments are equal, the size of packet "n" is "x" times the size of piece$_n$ of segment 1.

Although the sizes of the packets may vary from one packet to another, for each packet, the time required to access that packet and then read it must be less than or equal to the time required to transmit the data from the previous packet. This condition holds for all sequences of packets, including going from packet "n" to packet "1."

Data storage on a recording medium is mapped in accordance with the present invention for a data base broken into "x" segments and "n" pieces. Vertical boundaries 501, 503, 505 . . . 507, 509 are the end of the scope of a packet.

Data Retrieval

To read the data, all of the like designated pieces for a series of segments are designated as a packet. For example, referring back to FIG. 5, the data comprising piece one, ($c_1$) for each of the segments, ($k_1$) through ($k_x$), is stored and read as packet one "$p_1$." In other words, a packet can be all the data of a piece for each segment as defined by a physical boundary 501 . . . 509.

Figure 6A:
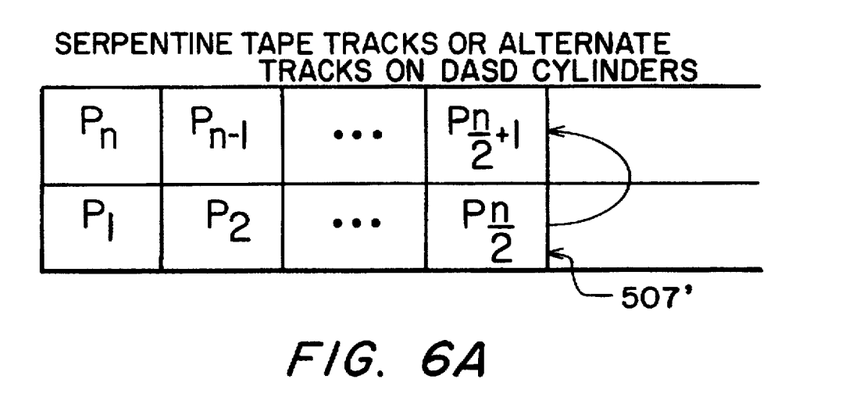
FIGS. 6A and 6B, is a schematic depiction of physical storage media having interleaved packets "$p_1$" through "$p_n$" according to the data set restructuring as shown in FIG. 5.
Figure 6B:
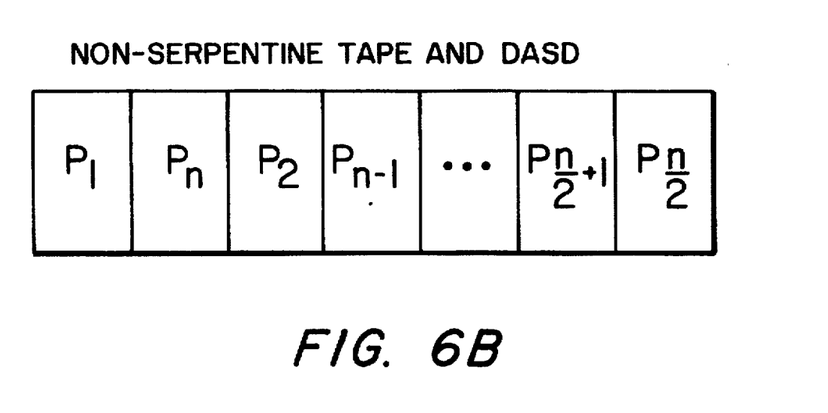

FIG. 6 generically depicts two types of preferred packet arrangements for different recording devices. If the device has multiple heads that can be accessed independently (such as different heads can on DASD) or tracks that are accessed in serpentine fashion, then packets can be arranged as in FIG. 6A, i.e., wrapped or folded so that packet "n" is physically near packet "1." Otherwise, the arrangement as shown in FIG. 6B is preferred so that physical motion is minimized and packet "n" is still physically near packet "1."

Figure 7A:
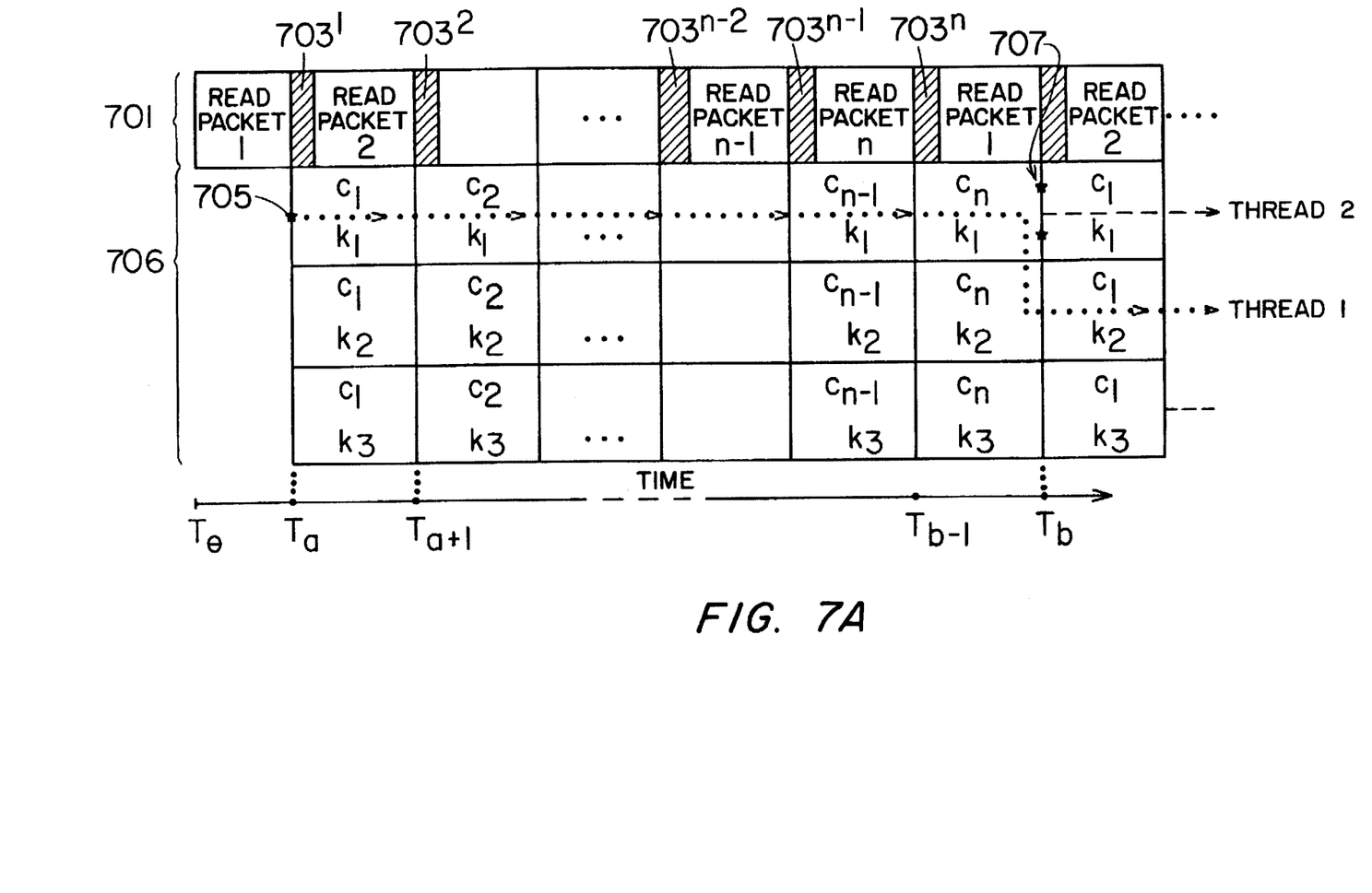
FIGS. 7A and 7B, is a timing schematic for the retrieving and transmitting of data packets from the mapped media according to the present invention as shown in FIG. 5.

FIG. 7A depicts what the READ data function and the thread transmission function data streams are doing over time from a start time, $T_0$, through $T_{B+}$. Assume for this example that the number of segments chosen is three, $x=3$, and the effective device transfer rate is at least three times greater than the end user(s) rate, and that the data will be delivered continuously. The READ data function is represented by construct 701. READ data latency periods are depicted at 703$^1$, 703$^2$ . . . 703$^n$ and may or may not occur depending upon the effective device transfer rate.

READ PACKET 1 is started at $T_0$ when the storage device 3, 5 is instructed to proceed to transfer data. At time $T_A$, namely when all of PACKET I has been transferred to the cache 9, transmission of PACKET 1 begins (denoted by the star 705) on, for example, line 17$_1$ with SEGMENT 1, PIECE 1 for THREAD 1. While that is occurring, the storage device 3, 5 has finished any non-transfer delays that exist, 703$^1$, and can READ PACKET 2. Since the storage device READ DATA rate is faster than transmission rate, READ PACKET 2 execution is finished on or before time $T_{A+1}$ when the transmission of SEGMENT 1, PIECE 1 is complete. Now transmission of SEGMENT 1, PIECE 2 can begin. The sequence continues until PACKET N, the last packet, is finished being READ by the storage device 3, 5 at time $T_{n-1}$. At time $T_{n-1}$, the storage device begins to read PACKET 1 again while segment 1, piece "n" information is transmitted to THREAD 1.

At time $T_B$, the storage device 3, 5 has again read PACKET 1. THREAD 1, having finished SEGMENT 1, PIECE "n," is now ready to use the data which has been mapped as SEGMENT 2, PIECE 1 (shown as a labeled dotted-arrow line).

Simultaneously, since the storage device 3, 5 has just read PACKET 1, a new THREAD 2 (labeled dash-arrow line) can be added (denoted by the double star 707) and can begin receiving the data in SEGMENT 1, PIECE 1.

The data from storage is stored in a cache 9 in the same order each time PACKET 1 is read. The threads must switch at the end of a pass to pick up the next data piece in a different section of cache as they switch from the data in one segment to obtain the data pieces in the next segment. This may be implemented in a different construct such that the data were stored in a different order in cache on each pass such that end users do not have to switch for an equivalent outcome. Such cache management techniques will be known to those skilled in the art.

In general, for an end user to use the entire data base once, the method will be repeated "x" times with the end user seeing data from segment one, $k_1$, on the first pass, data in segment two, $k_2$, on the second pass, and so on until seeing data segment "$k_x$" on the $x^{th}$ pass. Note also that this allows new end user's to join as an added thread each time that the system is ready to transmit packet P1 as shown in FIG. 7A.

One use of the data will require the user(s) to first get segment 1, piece 1, $k_1c_1$, belonging to packet$_1$; next $k_1c_2$ belonging to packet$_2$, et seq. through $k_1c_n$ from packet$_n$. After that, the users start over at packet$_1$ and get $k_2c_1$ et seq. The process will allow them to get $k_2c_1$ substantially simultaneously with other new user(s) beginning use of the data base with $k_1c_1$. The two sets of user(s) will remain in lock step through the packets with each receiving their required data from the same packet substantially simultaneously. At the end of the second pass, the first user(s) begin getting segment 3 information, the second user set begins getting segment 2, and the new user set begins with segment 1 information. This process continues until all "x" segments have been used by the first user(s) and their use terminates, yet the process will continue for the remaining users with each getting the next segment information and new sets joining on each pass until there are no more user(s).

Note that when the process is ready to transmit packet 1, there may or may not be user(s) ready to start. If no user(s) have arrived, then one of the segments will be unused throughout one full use of the segments.

User(s) arriving after the information in packet 1 has begun to be delivered, including when packets 2–n are being delivered, will have to wait for the beginning of packet 1 to again be delivered.

Figure 7B:
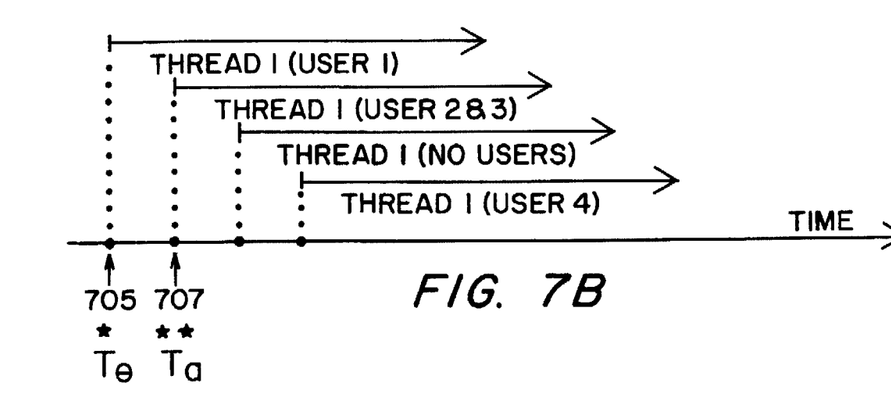

Elements 706 of FIG. 7A thus illustrate the capability of simultaneous transmission of data segments for a plurality of threads. FIG. 7B illustrates the point in simplified form. More than one thread can be active concurrently but each is offset from the others by a segment length with zero to a plurality of end users on each thread.

Figure 8:
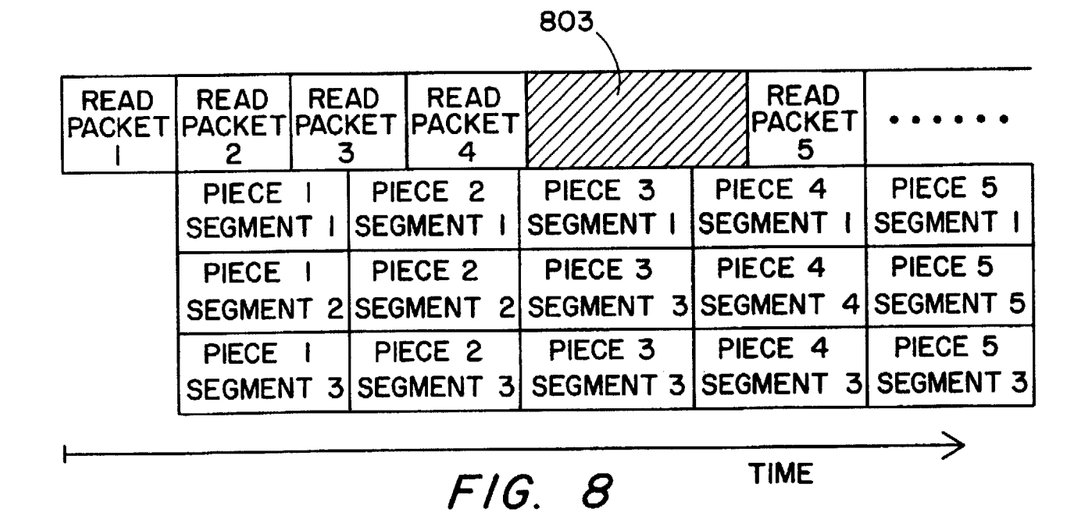
FIG. 8 is a alternative embodiment timing schematic for the present invention as shown in FIG. 5.

If latency periods are unequal or none exist between certain packets, the mapping of the data can be changed accordingly to accommodate the data base and storage device. An alternative embodiment is shown in FIG. 8 where the length of the packets is smaller than the frequency of the various read delays.

Interleaved Mapping

Non-transfer motions that are the result of physical constraints of the hardware can also be relieved by mapping with an interleaving of the front and back halves of the data for many hardware implementations. Referring back to FIGS. 5 and 6, if the packets are not interleaved such that the first, P1, and last, Pn, are neighboring on the medium, then the system will require a much larger buffer. That is, if the packets were stored sequentially, then there would be a long delay every 1/k period while either the entire tape rewound or other very long SEEK implementation was executed. U.S. patent application Ser. No. 08/176,162 referenced above describes an applicable formatting method.

Note that interleaving greatly reduces the maximum non-transfer motion. If the packets were laid sequentially, there would be a great delay every 1/k of the data while either the entire tape is rewound or a very large seek takes place. Thus, interleaving greatly reduces the amount of expensive buffering required. Interleaving may also increase the number of concurrent threads because there is no need to move from the end of the medium (e.g., end-of-tape, EOT) to the beginning of the medium (beginning-of-tape, BOT) to restart the pass through the thread and, therefore, the effective device transfer rate is higher.

For example, referring to FIG. 6, because of the inherent higher READ DATA rate over the transmission rate, this interleaved data mapping allows a READ of packet $P_1$, then a SKIP of packet $P_n$ and a reading of packet $P_2$ during transmission of the first piece of each of the "x" segments. Next, a SKIP packet $P_{N-1}$ and READ packet $P_3$ can be executed while transmitting the second piece of each of the "x" segments. This continues until packet $P_n$ is transmitted during which time the system can return to READ packet $P_1$. Note that the next packet to be read is never more than one packet away from the previous packet which minimizes the latency periods.

Exemplary Applications

For recording using alternating DASD tracks or for a tape formatted in serpentine recording [a general description of serpentine tape drive technology can be found, for example, in the STREAMING, Copyright 1982, Archive Corporation, Library of Congress Catalog No. 82-072125, incorporated herein by reference], FIG. 6A shows that this mapping places packets linearly to n/2 at which time a boundary 507' is encountered and a delay (represented by the arrow) to move to the next packet, n/2+1, occurs for switching heads and reversing direction to read the next packet.

FIG. 6B shows that this medium mapping places the packets in a folded and alternating manner for non-serpentine tape and DASD devices. Note that the packets are positioned in an interleaved manner on the storage medium such that latency periods can be minimized when data is retrieved for use by the threads.

Figure 9:
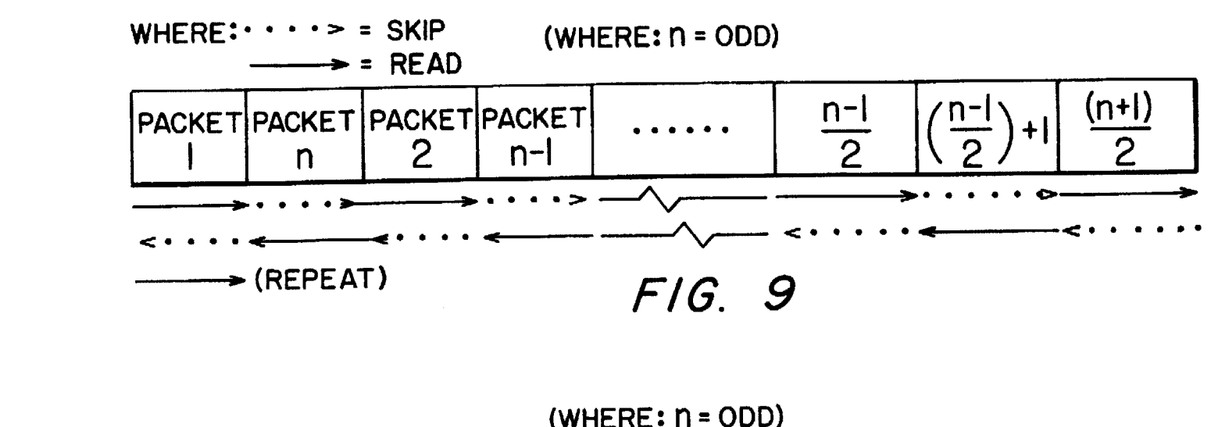
FIG. 9 is a schematic detailing of the physical storage layout of packets on an eighteen track tape capable of reading backward and a DASD for the present invention as shown in FIG. 5.

For a further explanatory example, FIG. 9 demonstrates a packet mapping layout for an industry standard, linear eighteen track parallel storage device. These devices can read backward and, therefore, the delays are minimized. The data layout would be as shown in FIG. 9.

Figure 10:
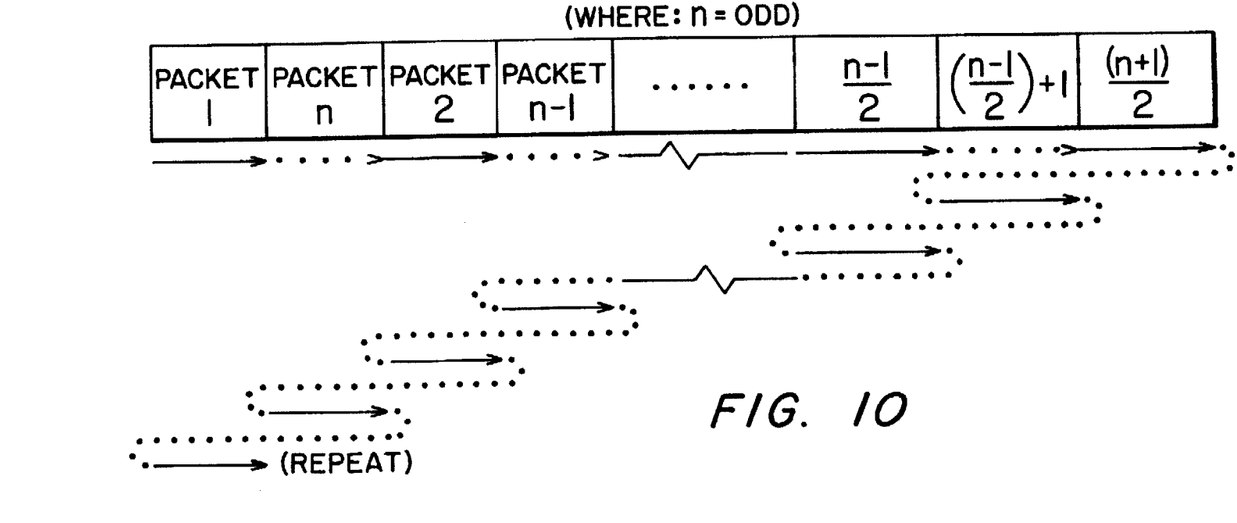
FIG. 10 is another schematic detailing physical storage layout of packets on helical scan tape or eighteen track tape which cannot be read backward for the present invention as shown in FIG. 5.

In another alternative embodiment, FIG. 10 shows a data mapping and retrieval example, for an industry standard DDS helical scan tape drive. On helical tape, the data will be put directly on the tape as shown. Since the READ DATA functionality in a DDS drive is unidirectional, a partial rewind and then a read forward to retrieve each of the second half of the packets is required. These additional motions reduce the effective device rate.

Figure 11:
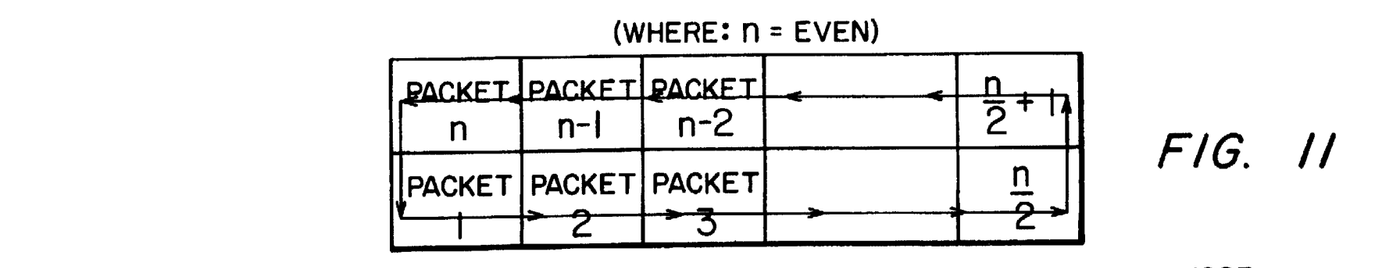
FIG. 11 is another schematic detailing physical storage layout for the present invention as shown in FIG. 5 adapted for use with a thirty six track tape drive device.

In another alternative embodiment, FIG. 11 shows a data mapping and retrieval example for an industry standard thirty-six track tape storage device is demonstrated. The tape is read in parallel in one direction and then backwards in the other. Therefore, the heads need only make one circle around the tape as shown by the arrow in FIG. 11 to transfer an entire segment.

DASD system implementations have many different formats with many different latency factors. Just a few possibilities for mapping are:

(1) using one track or cylinder for each packet (this would make the time to reposition for reading the next packet equal to the time required for a head switch or seek);

(2) making a sector represent a packet; or (3) making a packet=k words or sectors.

On DASD, the data would also be interleaved as in FIG. 6B so that the last packet is near the first.

Figure 12:
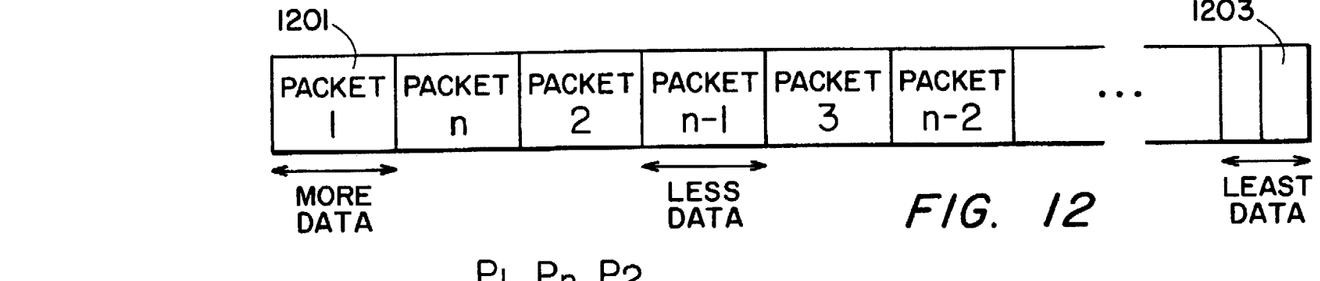
FIG. 12 is another schematic detailing physical storage layout for the present invention as shown in FIG. 5 adapted for use with a DASD system having a zoned addressing scheme.

FIG. 12 demonstrates that in zoned DASD system (where the outer cylinders have a greater capacity, it is possible to have packets of data on the outer 1201 diameter cylinder be larger than packets of data on the inner diameter cylinder 1203 if the implementation uses cylinders for packets. While this will influence the calculation of the effective device rate for "$x_{max}$," it will not greatly affect implementation.

Regardless of the storage device peculiarities, the main point is that optimized interleaving of the packets for each is employed to make it unnecessary to do any long SEEK command executions, thereby reducing the buffer capacity requirement.

Extension to Multiple Data Base Storage

Figure 13:
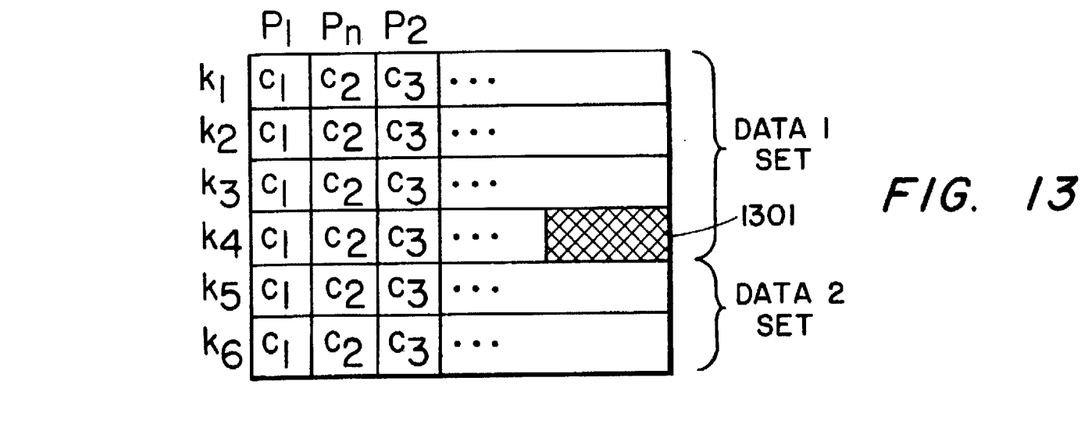
FIG. 13 is an alternative embodiment of the present invention as shown in FIG. 5 in which more than one data set is stored on a single medium.

For data bases that are going to have a high demand and are small enough to fit a single medium, the data mapping layout can be accomplished as shown in FIG. 13, where x=6. In the example, data base I is almost twice as long as data base 2. A region 1301 of no data exists between the data bases so that both data base sets can begin at packet 1. Therefore, in accordance with the method of the present invention, the maximum waiting time to start using either data base set is:

1/6 * (time to transmit both data bases sequentially), assuming that no extra buffering is used to allow packets to be read ahead of the time of actual use, and two different groups of user(s) can start each time packet I is available, those from data base I and those from data base 2. Note that this has allowed one device to service two sets of customer, but has increased their waiting time. Each could have only had a maximum wait of 1/6 * (time to transmit their specific data base), if two devices had been used. Notice here that if the data were more traditional data sets (files), that the beginning of each file is in packet "1" and that a traditional Forward Space File command is handled without requiring any physical motion of the tape (or a Seek to a new beginning of an extent is also accomplished without requiring head/arm movement).

Figure 14:
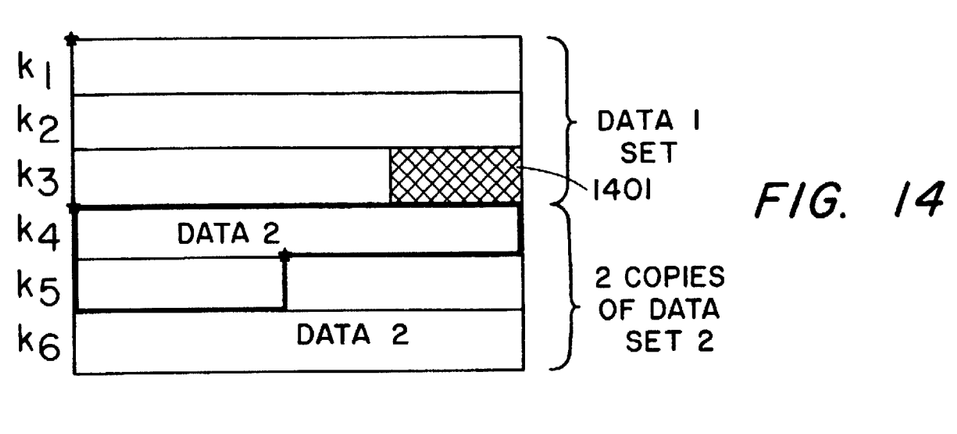
FIG. 14 is an alternative embodiment of the present invention as shown in FIG. 13 such that the average waiting time to data set two is half that of the average waiting time to data set one.

However, if there is room enough for a second copy of data base 2 on the medium, the data can be mapped as shown in FIG. 14, where x=6. There the maximum wait time for the first wait is:

1/6 * (time to transmit all three sets);

and the wait for the second is:

½ * 1/6 * (time to transmit all three sets).

As long as the mass storage device is sufficiently large, the waiting time can be reduced by adding additional copies of the data to the medium. This results in two different sets of data with different end-user latency periods on a single medium.

The length of each segment and number of segments will determine relative start times for the threads. In FIG. 13, data base 1 has four segments, "$k_1$" through "$k_4$."
A thread can be added once at the changeover to a next segment. In FIG. 14, each segment is a relatively longer data subset and there are only three segments, "$k_1$" through "$k_3$" in data base 1. Therefore, there will be a longer end user latency period. There is no limitation that subsets start immediately following a media boundary.

Figure 15:
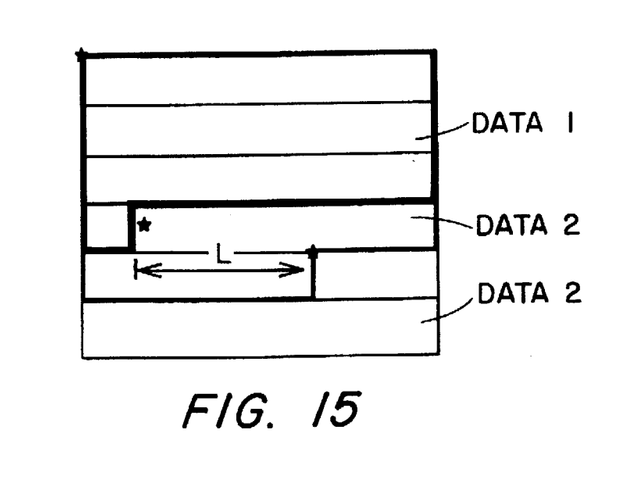
FIG. 15 is an alternative embodiment of the present invention as shown in FIG. 13 where the data base sets are mapped to maximize performance.
Figure 16:
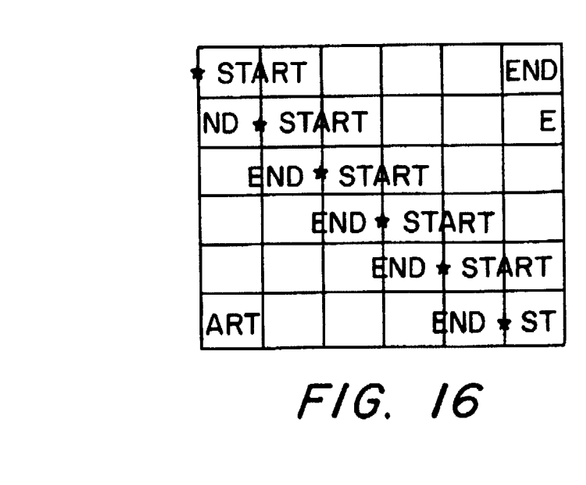
FIG. 16 is an alternative embodiment of the present invention as shown in FIG. 13 where the data base sets are mapped in a staggered fashion to reduce customer waiting time.

Although there is no requirement that $k_1+k_2+k_3=k_4+k_5+k_6$, it is assumed in the preferred embodiment. The number of segments assigned to an individual data base is important. If there are no data bases small enough and one chooses not to implement an offset of starting location for data bases, a pad area 1301, 1401 may be used to align data within segments (e.g., to conform to uniform track or cylinder boundary conditions or to simplify seek operations or starting algorithms). Such areas can be used for filler segments such as advertising, "time-to-show" countdowns, and the like. However, to improve the reduction of delay times, data can be stored without pad areas as shown in FIG. 15. This results in more complexity in the starting algorithms. Adding more copies of a serial data base set would also improve the end user latency condition but each must start at different positions to optimize performance as shown in FIG. 16, where x=6. As noted above, the most that the end user latency period can be reduced is to:

$1/x *$ (time to use the data base);

therefore, having more than "$x_{max}$" copies will not provide any performance advantage.

Reverse Implementation

Note now that all of the processes can be reversed and the scheme used to store data concurrently from a plurality of end users, e.g., nodes of a network where concurrent backup to a mass storage device is in progress. That is, with appropriate cache management, incoming data on lines $17_1$ ... $17_x$ can be written to storage media according to the mapping methodology in accordance with the present invention.

Essentially, the present invention teaches the writing of serial data such that it can be read substantially concurrently by a multiplicity of parallel users. The offset of threads will be only a multiple of 1/x of the data transmission time. The same basic method is applicable whenever there is a serial data base bigger than is cost effective to cache, there are numerous end users that want to access the data concurrently, and there is a data storage subsystem capable of reading the data at an effective data rate at least double the rate that is required by the end users, where there is substantially simultaneous use, that is an uninterrupted continuous display such as of a movie, and the end user stations maintain a predictable reception rate. The present invention maximizes the number of end users that can use the data base concurrently while minimizing the delay between when the customer wants to begin and can begin and the cost of the storage system necessary to store and access the information.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. For use with a data storage and retrieval system, a method for storing serial data on a storage medium to enable multiple and spatially separated users concurrent access to logically separated portions of a unitary serial data base, comprising:

a. dividing a serial data base into a plurality of sequential segments;

b. subdividing each said segment into a plurality of sequential pieces; and c. recording said serial data base onto a storage medium such that the serial data base is resequenced according to sequential piece order for all segments by sequential segment order so as to permit said concurrent access by said multiple users.

2. The method as set forth in claim 1, wherein said step of dividing a serial data base into a plurality of sequential segments comprises:

dividing said data into a plurality of first substantially equal data subsets.

3. The method as set forth in claim 2, wherein said step of dividing a data base into a plurality of first substantially equal data subsets further comprises:

dividing said data base into a number of segments, "x," where "x" is an integer less than or equal to the rate at which the data can be accessed by the data storage and retrieval system divided by the rate at which the data can be transmitted by the data storage and retrieval system.

4. The method as set forth in claim 1, wherein said step of dividing a serial data base into a plurality of sequential segments comprises:

dividing said data into a plurality of first predetermined or derivable different length data subsets.

5. The method as set forth in claim 4, wherein said step of dividing a data base into a plurality of first predetermined or derivative different length data subsets further comprises:

dividing said data base into a number of segments, "x," where "x" is in integer less than or equal to the rate at which the data can be accessed by the data storage and retrieval system divided by the rate at which the data can be transmitted by the data storage and retrieval system.

6. The method as set forth in claim 1, wherein said step of subdividing each said segment into a plurality of sequential pieces comprises:

subdividing each segment into a plurality of second substantially equal data subsets.

7. The method as set forth in claim 6, wherein said step of subdividing each said segment into a plurality of second substantially equal data subsets comprises:

subdividing each said segment into an integer "n" number of pieces "c" where "n" is greater than or equal to the data base size divided by the data storage and retrieval system capacity for buffering data.

8. The method as set forth in claim 1, wherein said step of subdividing each said segment into a plurality of sequential pieces comprises:

subdividing each segment into a plurality of second predetermined or derivable different length data subsets.

9. The method as set forth in claim 8, wherein said step of subdividing each said segment into a plurality of second predetermined or derivable data subsets comprises:

subdividing each said segment into an integer "n" number of pieces "c" where "n" is greater than or equal to the data base size divided by the data storage and retrieval system capacity for buffering data.

10. The method as set forth in claim 1, further comprising:

repeating said steps a., b., and c., for each data base stored on said medium.

11. The method as set forth in claim 10, further comprising:

storing a sequential plurality of redundant second data bases on said medium.

12. The method as set forth in claim 11, wherein said step of storing a sequential plurality of redundant second data bases further comprises:

storing "s" said second data bases, where "s" an integer less than or equal to the capacity of the storage medium allocated for said data base divided by the volume of said data base.

13. A method for providing substantially concurrent access by a number of threads to a unitary serial data set on a storage medium adapted for use with a data storage and retrieval device, comprising:

a. calculating the maximum number of threads to be transmitted concurrently;

b. recording said data set onto the medium in packets such that:
  i. said data set is partitioned into a plurality of first subsets equal to the number of threads to be transmitted,
  ii. each first subset is subpartitioned into a plurality of second subsets, and
  iii. said data set is written onto the medium in sequential data packets having said first and second subsets reordered such that each sequential packet contains a data sequence of all like sequenced second subsets of all first subsets; and c. transmitting packets concurrently to each thread while reading the next sequential packet from said medium.

14. The method as set forth in claim 13, the step of transmitting packets concurrently to each thread further comprises:

adding another thread following each reading of the first packet of said sequential data packets.

15. The method as set forth in claim 13, wherein the step of calculating the number of threads to be transmitted concurrently comprises:

dividing the data storage and retrieval device effective data transfer rate by the transmission system transmission rate, and rounding the quotient down to the next integer.

16. The method as set forth in claim 13, wherein the step of recording said data set onto the medium in packets further comprises:

calculating the number of first subset partitions by dividing the data storage and retrieval device effective data transfer rate by the transmission system transmission rate, and rounding the quotient down to the next integer.

17. The method as set forth in claim 13, wherein the step of recording said data set onto the medium in packets further comprises:

calculating the number of second subset subpartitions by dividing the entire data set size by the data storage and retrieval system capacity for buffering data.

18. The method as set forth in claim 13, wherein the step of recording said data set onto the medium in packets further comprises:

dividing the data base first subsets into pieces "$c_n$" where:

$$n \geq \frac{\text{data base size (bytes)}}{\text{cache buffer size (bytes allocated)}},$$

wherein the largest piece, "$c_{max}$" is:

$$c_{max} = \frac{\text{cache buffer size allocated for transfer of data base}}{\text{number of first subsets}}.$$

19. The method as set forth in claim 13, further comprising:

repeating said steps a., b., and c., for each data set stored on said medium.

20. The method as set forth in claim 13, further comprising:

storing a sequential plurality of redundant second unitary data sets on said medium.

21. The method as set forth in claim 20, wherein said step of storing a sequential plurality of redundant second data sets further comprises:

storing "s" said second data sets, where "s" an integer less than or equal to the capacity of the storage medium allocated for said data set divided by the volume of said data set.

22. A serial data set storage and retrieval method for recording at least one unitary data set onto a recording medium adapted for use with a read-write data recording device, having a predetermined effective data transfer device rate, operatively connected to a data transmission device having a cache memory operatively connected a plurality of input-output lines for concurrent access by up to a like plurality of end users at a predetermined transmission rate, comprising:

a. recording said data set onto said medium by:
  i. dividing the unitary data set into a plurality of substantially equal segments, "$k_x$," where "x" is an integer $\geq 1$ and $\leq$ "$x_{max}$";

ii. $x_{max} = \frac{\text{effective device rate (quantity/second)}}{\text{transmission rate (quantity/second)}}$;

iii. subdividing each segment "k" into a plurality "n" of pieces "c" where "$c_{max}$" defining a largest piece size is defined as:

$$c_{max} = \frac{\text{cache buffer size}}{x}$$

and;

iv. regrouping said segments and pieces into a sequence of packets stored on said medium such that said sequence is determined by the expression $$\text{packet}_j = p_j = \sum_{i=1}^{i=x} \text{pieces } c_j \text{ from segment } k_i$$

b. repeatedly reading said packets in sequence into said cache memory;

c. following a reading of a sequential packet, concurrently transmitting that sequential packet to each of said threads seeking retrieval of said data set while reading the next sequential packet of said data set;

d. repeating step c. for each packet until last packet $p_j$ is retrieved by each thread, respectively; and e. repeating steps b., c., d. sequentially until the last piece is retrieved by the last active thread.

23. The method as set forth in claim 22, wherein said step of regrouping said segments and pieces into a sequence of packets further comprises:

recording packets such that a packet is less than or equal to the capacity of said storage medium to hold a subset of data that can be read without a substantial storage device latency interruption.

24. The method as set forth in claim 22, wherein said step of regrouping said segments and pieces into a sequence of packets further comprises:

access and read time for each said recording packet is less than or equal to time required to transmit the data from the previous packet.

25. The method as set forth in claim 22, further comprising:

searching for a data set recorded in accordance with steps a.i. through a.iv. wherein said data set is a data file and each said file begins in packets, whereby a next file can be accessed without physical motion of said medium.

26. A recording medium having written thereon at least one serial data set, having a logical data structure, said medium being adapted for use with a media read-write device having a predetermined effective data transfer rate, "TR," connected to a data transmission-reception system, having a predetermined end user data transmission-reception rate, "EUTR," and a concurrent input-output capability for "n" sets of end users at "n" locations in the data, said medium comprising:

a substrate;

a recording area on said substrate having packets of data, "$p_1$" through "$p_j$" sequentially recorded thereon, said packets of data having a data structure resequenced from said serial data set logical data structure by:

i. said logical data structure being partitioned into substantially equal segments, "$k_1$" through "$k_x$", where "x" equals the number of concurrent end users that can be supported by said system;

ii. each said segment being further partitioned into substantially equal pieces, "$c_1$" through "$c_n$", where "n" ≥ TR/EUTR; and iii. said segments and pieces being resequenced according to sequential piece order for all segments by sequential segment order.

27. A method for storing serial data to enable access to a unitary serial database stored on an accessible storage medium adapted for use with a data storage and retrieval system, comprising:

a) dividing a serial database into a plurality of sequential segments;

b) subdividing each set segment into a plurality of sequential pieces;

c) recording said serial database onto a storage medium such that the serial database is resequenced according to sequential piece order for all segments by sequential segment order;

d) designating all sequential segments having identical sequence pieces as a packet for transmission by said data storage and retrieval system for access such that latencies are minimized; and e) interleaving said packets on said medium such that a packet containing a final piece of a final segment is physically adjacent a packet containing initial pieces of initial segments.

28. A method for providing access by a number of threads to a unitary serial data set on a storage medium adapted for use with a data storage and retrieval device, comprising:

a) calculating the maximum number of threads to be transmitted;

b) recording said data set onto the medium in packets such that:

i) said data set is partitioned into a plurality of first subsets equal to the number of threads to be transmitted;

ii) each first subset is subpartitioned into a plurality of second subsets;

iii) said data set is written onto the medium in sequential data packets having said first and second subsets reordered such that each sequential packet contains a data sequence of all like sequenced second subsets of all first subsets; and iv) interleaving said packets on said medium such that a packet containing a final second subset of all the first subsets is physically adjacent a packet containing the first subset of all the first subsets; and c) transmitting packets to each thread while reading the next sequential packet from said medium.

* * * * *